(12) United States Patent
Polatov

(10) Patent No.: US 8,465,986 B2
(45) Date of Patent: Jun. 18, 2013

(54) SUBMERGIBLE SPRAY CHAMBER FOR A TABLET

(75) Inventor: Elmar Polatov, Brooklyn, NY (US)

(73) Assignee: EZ WYP, Inc., Brooklyn, NY (US)

( * ) Notice: Subject to any disclaimer, the term of this patent is extended or adjusted under 35 U.S.C. 154(b) by 960 days.

(21) Appl. No.: 12/551,604

(22) Filed: Sep. 1, 2009

(65) Prior Publication Data

US 2011/0048545 A1 Mar. 3, 2011

(51) Int. Cl.
*G01N 1/00* (2006.01)
(52) U.S. Cl.
USPC ........... 436/174; 436/178; 422/500; 422/504; 222/192; 222/321.7; 141/113; 141/319; 141/352
(58) Field of Classification Search
USPC ........ 222/192, 321.7; 436/174, 178; 422/500, 422/504; 141/113, 319, 352
See application file for complete search history.

(56) References Cited

U.S. PATENT DOCUMENTS

| | | | | |
|---|---|---|---|---|
| 2,699,885 A | * | 1/1955 | McClure | 141/320 |
| 5,119,830 A | * | 6/1992 | Davis | 600/584 |
| 6,074,606 A | * | 6/2000 | Sayles | 422/417 |
| 2008/0202556 A1 | * | 8/2008 | Pivonka et al. | 134/9 |

* cited by examiner

*Primary Examiner* — Lyle Alexander
(74) *Attorney, Agent, or Firm* — Michael J. Feigin, Esq.; Feigin & Associates, LLC

(57) ABSTRACT

Embodiments of the disclosed technology comprise a chamber adapted for placement therein of a tablet, when a spring-loaded plunger is in a resting position. In this manner, a tablet, such as one formed of a sheet of absorbent material (e.g., made from bamboo or rayon) and pressed into the tablet form, may be evenly doused with a liquid such as water or soapy water without spillage or substantial (more than a few drops) spillage.

19 Claims, 10 Drawing Sheets

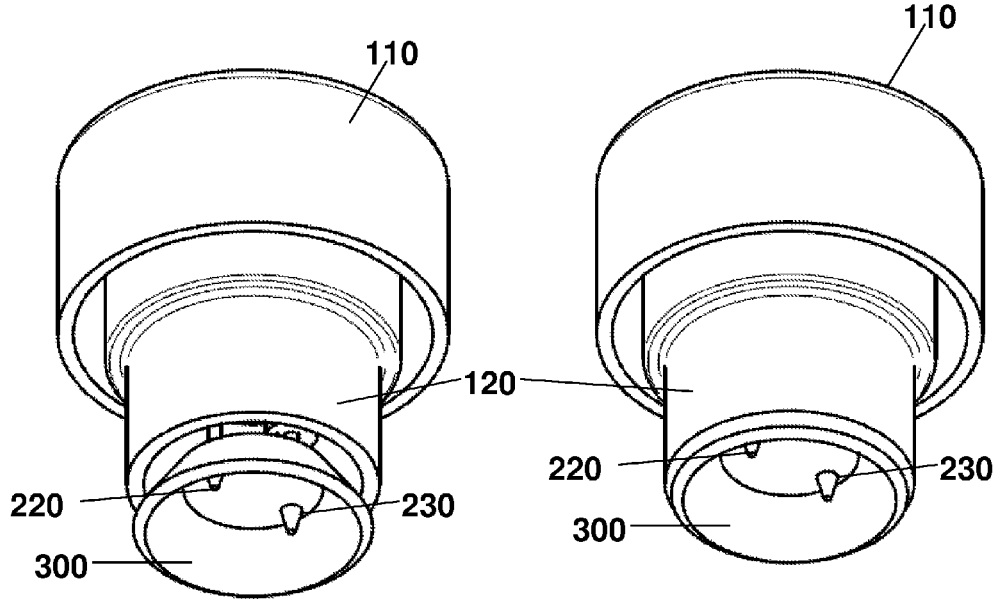
Figure 5C    Figure 5A
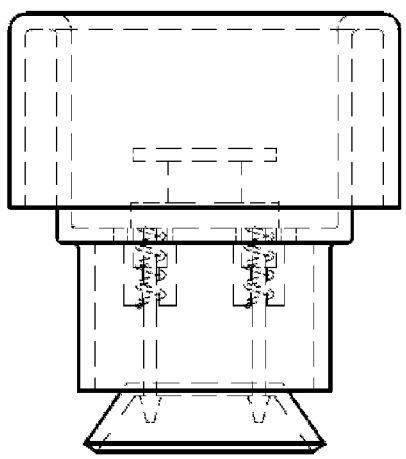  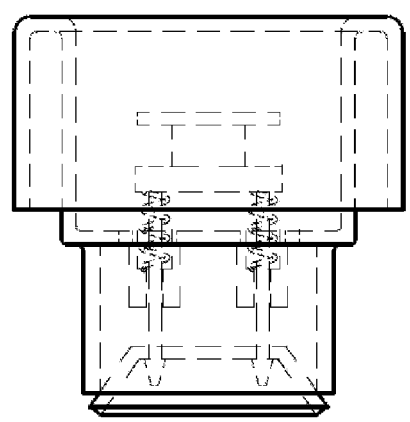
Figure 5D    Figure 5B

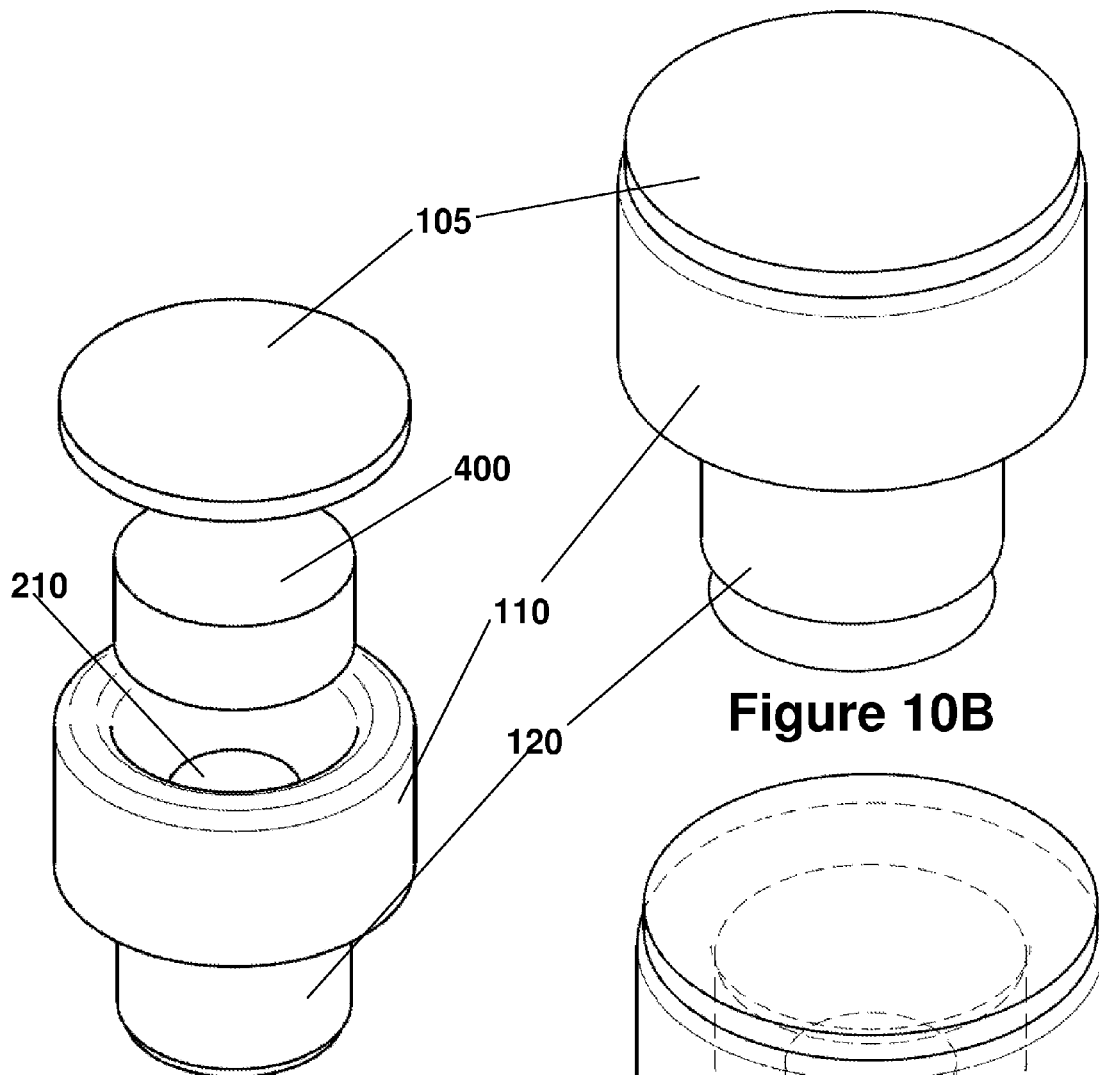
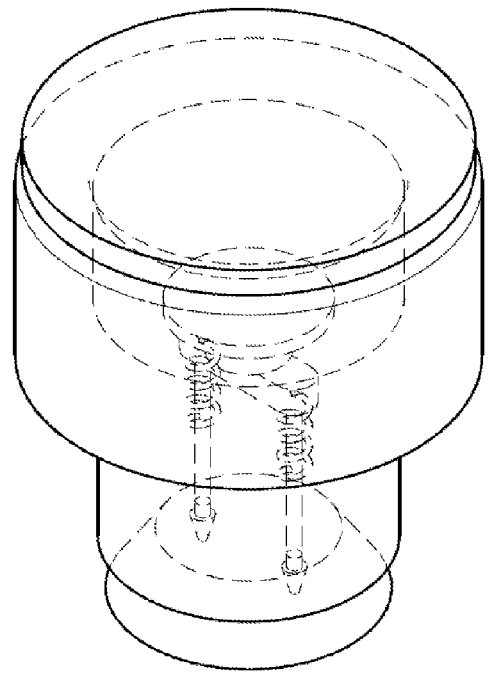
Figure 10A
Figure 10B
Figure 10C

SUBMERGIBLE SPRAY CHAMBER FOR A TABLET

BACKGROUND OF THE DISCLOSED TECHNOLOGY

Moist towelettes are known in the art. They are conveniently packaged so that the user can open them, and take one out to clean a person's skin or any other surface. Such towelettes are typically packed with chemicals to preserve their shelf life and require packaging for each and every towelette sold, because each wrapper must remain sealed to the air, in order to remain moist. It should be noted that the processing of the synthetic fibers used in many towelettes requires a significant amount of energy.

In an effort to develop more ecological versions of moist towelettes, versions made out of natural fibers such as bamboo or a semi-natural/semi-synthetic fiber such as rayon are available to a consumer in dried form, such as packed into a tablet-shaped cylinder which expands into a towelette upon being doused with water. In this method, individual packaging is not necessary for each and every towelette, but a new problem arises in that one must add water. The convenience of a pre-moistened towelette is missing with such devices.

Prior art systems for transporting water with such towelettes are known, but are inefficient and wasteful. For example, systems and devices designed for pouring water on such tablets either do not disperse water evenly throughout the towelette, resulting in some areas which are drier than others, or supply so much water that the towelette then becomes soaked and water runs off during the wetting process, causing it to be wasted. This, of course, counteracts the ecological friendliness of using a towelette formed from natural substances.

What is needed in the art is a method and device to provide the most appropriate quantity of water to a tablet-shaped or any other towelette, using natural products, and preventing waste.

SUMMARY OF THE DISCLOSED TECHNOLOGY

It is therefore an object of the disclosed technology to provide a device and method for hydrating a towelette, such as a tablet-shaped towelette formed from natural substances, without waste.

In an embodiment of the disclosed technology, a chamber and plunger are disclosed which serve a purpose of providing adequate hydration with minimal or no spills. This is accomplished by way of a chamber with a sealable top opening and by a plurality of spring-loaded stems of the plunger. Each spring-loaded stem passes through an aperture in the chamber, and is adapted for passage of liquid therethrough, and the stems extend through a diaphragm. Thus, when the stem is activated by way of pressing the sealable top, a tablet which is situated fully within the chamber pushes down on the stems, and water enters above the pushed diaphragm, through the apertures, and into the chamber to surround the tablet or other towelette.

In order to accomplish this when using a tablet, the tablet must have a circumference smaller than that of the chamber, and in embodiments thereof, the tablet fits within the chamber when in a resting (non-depressed) condition of the chamber and plunger. A ratio of a height of the tablet to the height of the chamber may be 5:9, which has been determined to be a very effective ratio for complete hydration without leakage. When the plunger is depressed, with such a height ratio, all sides of the tablet are hydrated fairly equally.

Devices of the disclosed technology may be packaged as a kit comprising a chamber and tablet, the chamber comprising a spring-loaded plunger and a flexible cover, whereby a vertical rise between a top of the plunger and the flexible cover is substantially a height of said tablet (in a resting position thereof). The plunger may form a unitary structure with a plurality of plungers, and the tablet may be a towelette. The vertical rise between the top of the plunger and the flexible cover, as well as the height of the tablet, may be ¼ inch. The height of an interior of the chamber may be between (inclusive) ⅜ and ½ inch.

A cylindrical chamber is also claimed. Such a chamber has a top and bottom. A spring-loaded plunger extends from the bottom, the plunger forming a unitary structure with stems extending through a bottom aperture of the chamber to an exterior (outside) of the chamber. The chamber is further adapted for loose fitting placement of a cylindrical tablet therein, the tablet comprising a bottom, side and top. The spring-loaded plunger has a first resting position and a second depressed position, whereby in said first resting position, the side of the cylindrical tablet is surrounded by the chamber, and, in a second depressed position of the spring loaded-plunger, the top side of the cylindrical tablet is below the top of the cylindrical chamber and the bottom aperture allows entry of liquid into the chamber.

In the second depressed position, the tablet may be surrounded by liquid. A cover of the cylindrical chamber may be adapted for substantially watertight (meaning, generally able to hold most of the water inside the chamber or not allowing more than a few drops of water to escape) engagement with the chamber.

A change from the first resting position to the second depressed position may be accomplished by way of pressing the tablet against the plunger.

A method for submerging a tablet in water is also part of the disclosed technology. The method proceeds by placing a bottom of a tablet on a plunger, the plunger being situated in a chamber and comprising plungers extending out a first side of the chamber, in such a manner that the side of the tablet is surrounded by the chamber. While holding the tablet in position on the plunger and inverting the tablet, plunger, and chamber all at one time, a user then depresses the tablet and the plunger, allowing liquid to enter the chamber and submerge (which is defined as surrounding at least 50% of the exterior of the tablet with the liquid) the tablet in liquid.

A cap may be placed on the tablet before it is held in place, e.g., a cap of the chamber. In this manner, the depressing described above is carried out by way of depressing the cap into the tablet, which in turn, depresses the plunger and allows liquid to enter the chamber. Such a cap may form a substantially watertight seal with the chamber, at least during said step of depressing. The chamber may then be substantially filled (at least 90% of the space around the tablet) with the liquid.

A device comprising the tablet, the liquid, the cap, and the plunger, adapted for carrying out the above method is also disclosed and claimed.

BRIEF DESCRIPTION OF THE DRAWINGS

FIG. 5A shows a bottom perspective view of devices of the disclosed technology in a first, resting configuration.

FIG. 5B is a side, translucent version of FIG. 5A.

FIG. 5C shows a bottom perspective view of devices of the disclosed technology in a second, depressed configuration.

FIG. 5D is a side, translucent version of FIG. 5C.

FIG. 10A shows an exploded view of a chamber with diaphragm, tablet, and sealable top cover in an embodiment of the disclosed technology.

FIG. 10B shows a top side perspective view of a sealed chamber with tablet therein in an embodiment of the disclosed technology.

FIG. 10C is a translucent version of FIG. 10B.

DETAILED DESCRIPTION OF EMBODIMENTS OF THE DISCLOSED TECHNOLOGY

Embodiments of the disclosed technology comprise a chamber adapted for placement therein of a tablet, when a spring-loaded plunger is in a resting position. That is, a tablet fits within a generally cylindrical chamber such that a flexible, yet sealing cap or cover may be placed on top of the chamber. In this manner, a tablet, such as one formed of a sheet of absorbent material (e.g., made from bamboo or rayon) and pressed into the tablet form, may be evenly doused with a liquid, such as water or soapy water, without any spillage or substantial (more than a few drops) spillage. To further ensure equal distribution of liquid on the tablet, a plurality of stems, in embodiments of the disclosed technology, extends past a lower aperture of the chamber, such that in a second, depressed state of the plunger, a diaphragm attached to the stems extends fairly evenly (e.g., is pressed down at least two spaced apart positions) so as to allow the liquid to enter the chamber via the lower aperture at all points surrounding it.

Embodiments of the disclosed technology will become clearer in light of the description of the following figures.

Figure 1A:
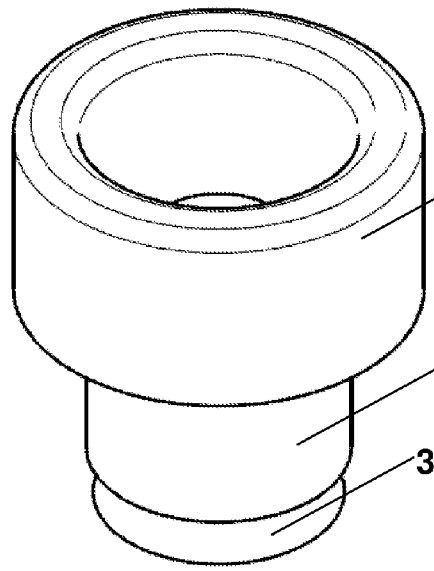
FIG. 1A shows a side elevation view of a chamber and diaphragm in an embodiment of the disclosed technology.
Figure 1B:
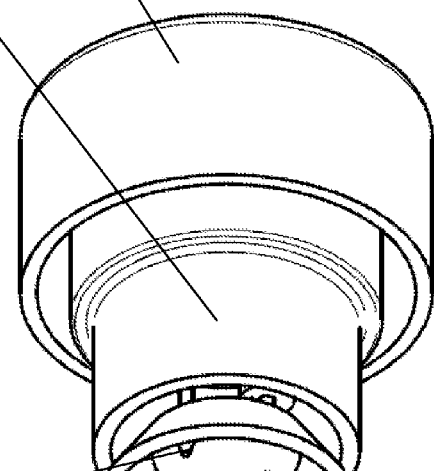
FIG. 1B shows a bottom perspective view of a chamber and diaphragm in an embodiment of the disclosed technology.
Figure 1C:
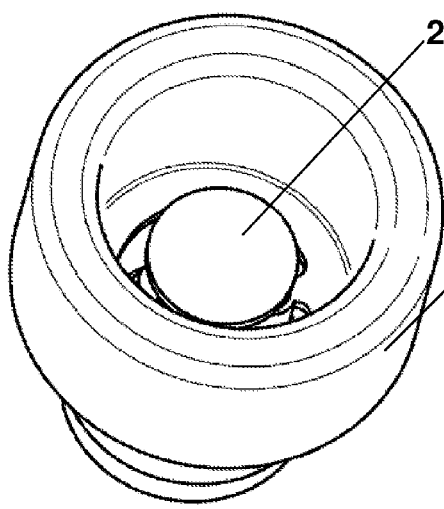
FIG. 1C shows a top perspective view of a chamber, diaphragm, and plunger in an embodiment of the disclosed technology.

FIG. 1A shows a side elevation view of a chamber and diaphragm in an embodiment of the disclosed technology. FIG. 1B shows a bottom perspective view of a chamber and diaphragm in an embodiment of the disclosed technology. FIG. 1C shows a top perspective view of a chamber, diaphragm, and plunger in an embodiment of the disclosed technology. Describing these figures together, an upper portion of the chamber 110 forms a unitary structure with a lower portion of the chamber 120. The upper portion 110 is wider so as to allow for, or be adapted for, placement of a tablet therein, whereas the lower portion houses most of a plunger 210, the plunger comprising stems 220 and 230 terminating beneath an end, such as the lower end, of the chamber 110/120. Any number of spaced apart stems may be used, such as 1, 2, 3, 4, 5, or 6. The stems 220 and 230 are fixedly attached to a diaphragm 300. In FIG. 1C, the plunger is in a partially depressed condition, such that the diaphragm is separated from the lower portion of the chamber 120 and liquid may enter the space between the diaphragm 130 and the chamber 120. The entire device shown in FIGS. 1A, 1B, and 1C may be attached to, or held firmly next to, a liquid source, such as a hose, faucet, liquid filled container, or the like. The outer lip region of the upper portion of the chamber 110 may fit over an opening of such a liquid source to prevent leakage and ensure that liquid enters, by way of gravity or positive pressure exerted on the liquid in the water source, only into the chamber via the aperture at the end of the chamber between the chamber and diaphragm.

Figure 2A:
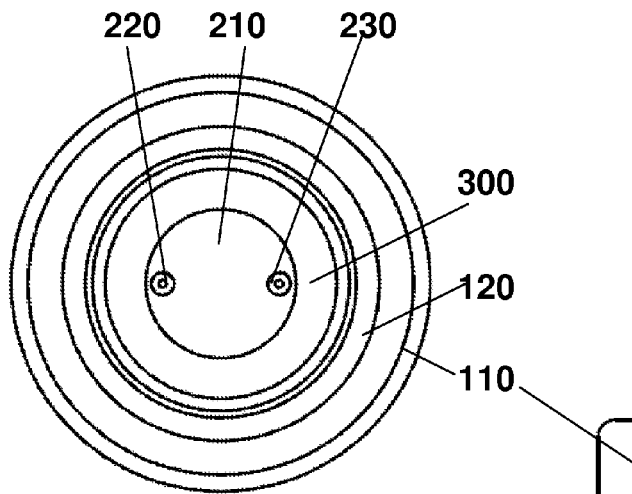
FIG. 2A shows a bottom plan view of a chamber, plunger, and diaphragm combination in an embodiment of the disclosed technology.
Figure 2B:
FIG. 2B shows a side view of a chamber, plunger, and diaphragm combination in an embodiment of the disclosed technology.
Figure 2C:
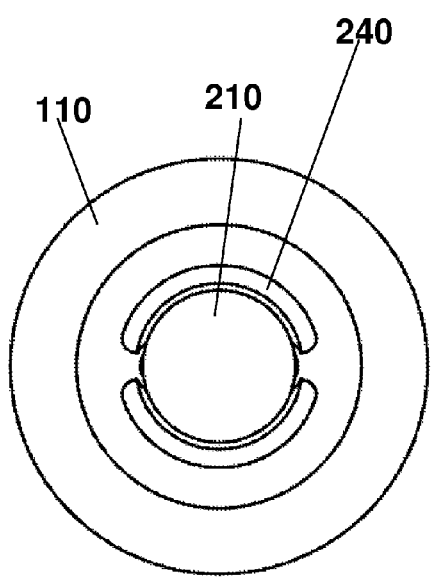
FIG. 2C shows a top plan view of a chamber, plunger, and diaphragm combination in an embodiment of the disclosed technology.

FIG. 2A shows a bottom plan view of a chamber-plunger-diaphragm combination in an embodiment of the disclosed technology. FIG. 2B shows a side view of a chamber-plunger-diaphragm combination in an embodiment of the disclosed technology. FIG. 2C shows a top plan view of a chamber-plunger-diaphragm combination in an embodiment of the disclosed technology. The stems 220 and 230 extend through the diaphragm 300, as seen in FIG. 2A. On the other side (the "upper" side), the plunger 210 is situated in the upper portion of the chamber 110 and may be held in place with brackets 240.

Figure 3:
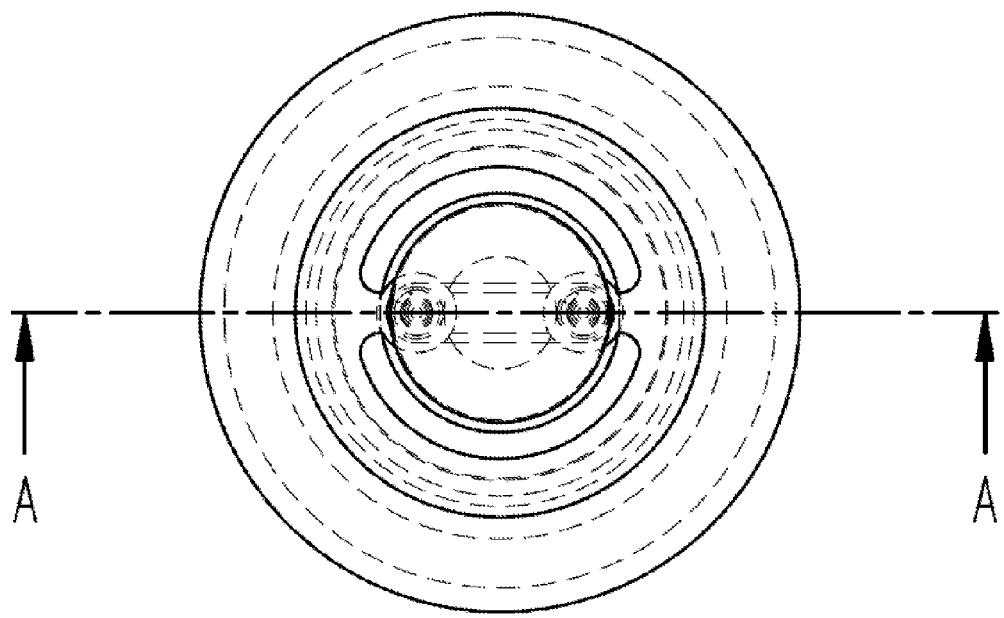
FIG. 3 shows a top plan view with depth indication of a chamber, plunger, and diaphragm combination in an embodiment of the disclosed technology.
Figure 3A:
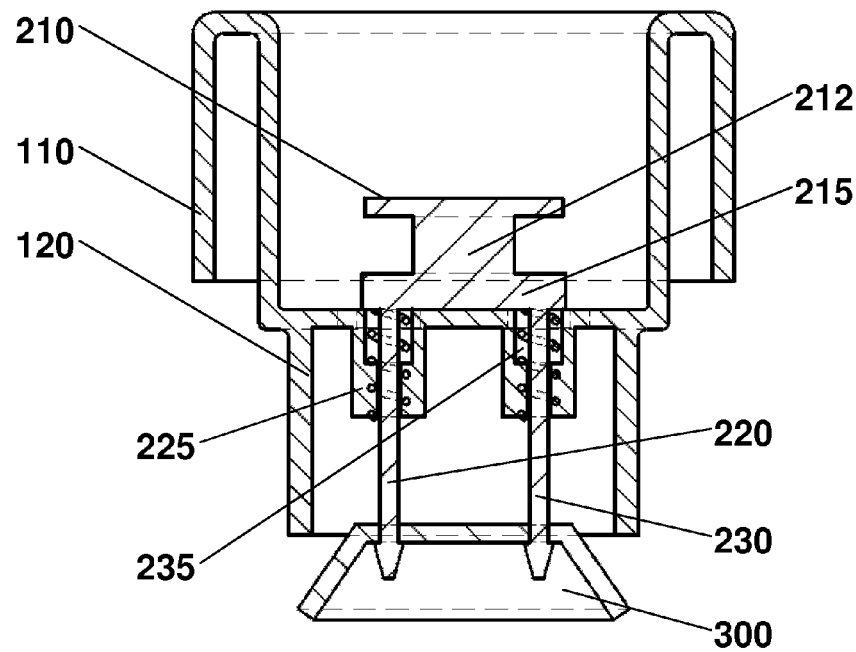
FIG. 3A shows a section of the chamber, plunger, and diaphragm combination cut along section line A-A of FIG. 3.

FIG. 3 shows a top plan view with depth indication of a chamber-plunger-diaphragm combination in an embodiment of the disclosed technology. FIG. 3A shows a section of the chamber-plunger-diaphragm combination cut along section line A-A of FIG. 3. The dotted lines on FIG. 3 indicate the contour of devices used in embodiments of the disclosed technology. Referring now more specifically to FIG. 3A, in the sectional view, the plunger with stems may be seen clearly. The plunger 210 has a first uppermost region where a tablet may be placed on top or the plunger may be pressed by way of exerting positive pressure against the top of the plunger (the area at which the "210" label is pointing). This top region serves as a base for a tablet to be placed. Neck 212 is a joining piece between the top part and a wider stem-supporting region 215, and allows for decreased cost (less material needed) and increased liquid filling within the cavity of the chamber, due to the greater space provided for the liquid. As such, the liquid may then enter the chamber more evenly and fill the rest of it.

The stems 220 and 230 are formed, in an embodiment of the disclosed technology, as a unitary piece with the top region, neck 212, and step supporting region 215. The stems 220 and 230 are at least partially surrounded by respective springs 225 and 235, causing the stems to be spring-loaded. Thus, in a resting configuration, the springs push the plunger 210 upwards and are calibrated in such a way that a desired height of the plunger is maintained in the resting configuration thereof. This height is one which ensures that the vertical distance between the top of the chamber and top of the plunger is at least the height of a tablet to be used therein. In some embodiments, the height between the top of the plunger and the top of the chamber is exactly the height of a tablet to be used therein. In this position, compared to any other, pressing down the tablet (and the plunger) to allow liquid to enter through a bottom aperture takes the least amount of effort possible, while ensuring that, at all times when liquid is entering, the entirety of the tablet is within the chamber itself. This is especially useful when a cap/cover is used on the top of the tablet, as will be discussed below.

Figure 4A:
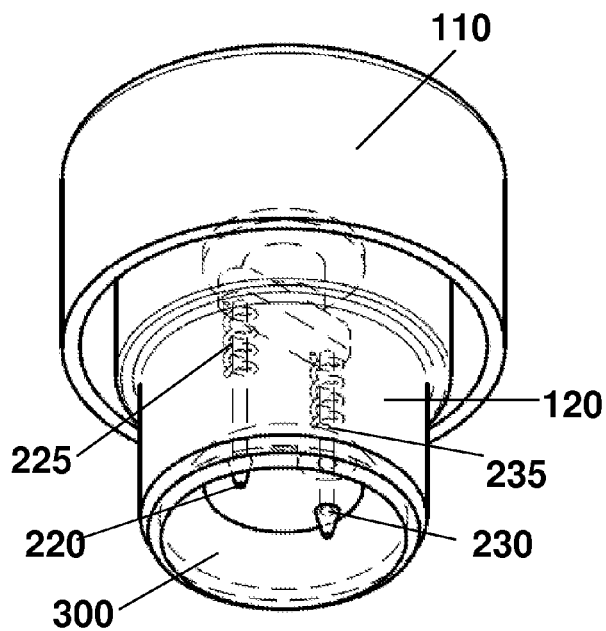
FIG. 4A is a translucent version of FIG. 1B.
Figure 4B:
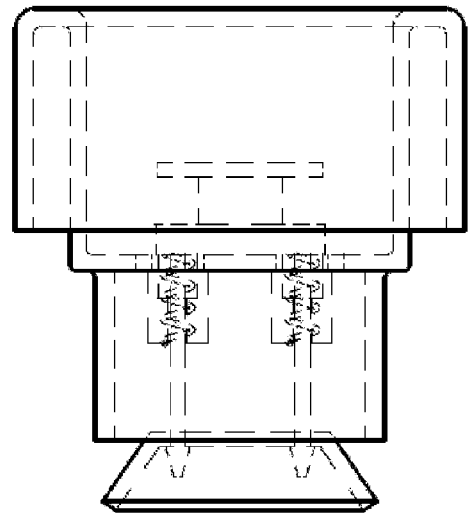
FIG. 4B is a translucent version of FIG. 2B.
Figure 4C:
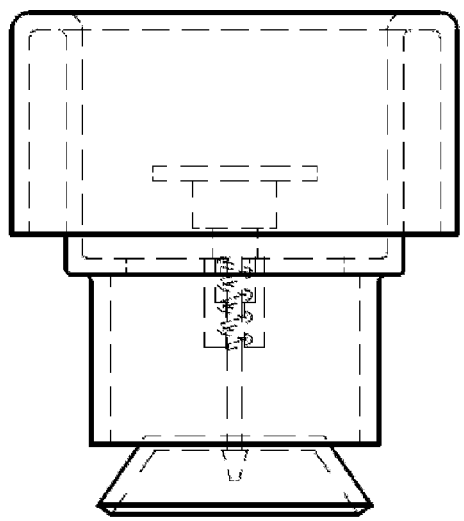
FIG. 4C is a translucent version of FIG. 2B, turned 90 degrees with respect to the view in FIG. 4B.

FIG. 4A is a translucent version of FIG. 1B. FIG. 4B is a translucent version of FIG. 2B. FIG. 4C is a translucent version of FIG. 2B, turned 90 degrees with respect to the view in FIG. 4B. In these figures, the dimensions of the plunger 210 with respect to the chamber 110/120 and associated parts may be seen clearly. The stems 220 and 230 of the plunger are parallel and spaced apart, in this embodiment, such that when the plunger is depressed, the diaphragm lowers more evenly than when a single plunger is used (though a single plunger may be used in embodiments). Each side of the diaphragm 300 lowers simultaneously by way of a stem 220 or 230 passing there-through. Liquid entering only on one side of the aperture of the chamber may be prevented using the disclosed technology because, by way of stems at a plurality of locations within the diaphragm, the diaphragm separates from the chamber evenly or substantially evenly (within a ⅛ inch margin of error) when the plunger is depressed.

FIG. 5A shows a bottom perspective view of devices of the disclosed technology in a first, resting configuration. FIG. 5B is a side, translucent version of FIG. 5A. FIG. 5C shows a bottom perspective view of devices of the disclosed technology in a second, depressed configuration. FIG. 5D is a side, translucent version of FIG. 5C. As seen in FIGS. 5A and 5B, the diaphragm 300 abuts the lower portion of the chamber 120, forming a watertight seal by way of the diaphragm being pulled upwards against the chamber due to the spring-loaded pins 220 and 230, fixedly attached to the diaphragm. The diaphragm may be made of flexible material (e.g., a plastic or polymer) so ensure a tight seal, whereas the chamber may be made of a rigid material. When the plunger 210 (seen inside FIGS. 5B and 5D) is depressed, the entire plunger (with stems 220 and 230 and springs 225 and 235) is depressed. The diaphragm 300, which is fixedly attached to terminating regions or ends of the stems is then moved away from the chamber 120 in a substantially even or even manner. Liquid may now enter through the aperture at bottom of the chamber, between the aperture/chamber itself, and the diaphragm.

The entering of liquid through the aperture (circular opening at the bottom of the chamber 120) may be accomplished, as noted above, by way of positive pressure being exerted on a liquid to force the liquid into the chamber where an awaiting tablet, situated on the top of the plunger 210, is hydrated with the liquid. The liquid may be water, water mixed with a soap solution, alcohol, or any other cleaning or cleansing product known in the art of furniture, kitchen, or face cleaning. One method in which the hydration of the tablet may be accomplished will be further discussed with regard to FIGS. 10A, 10B, and 10C.

Figure 6:
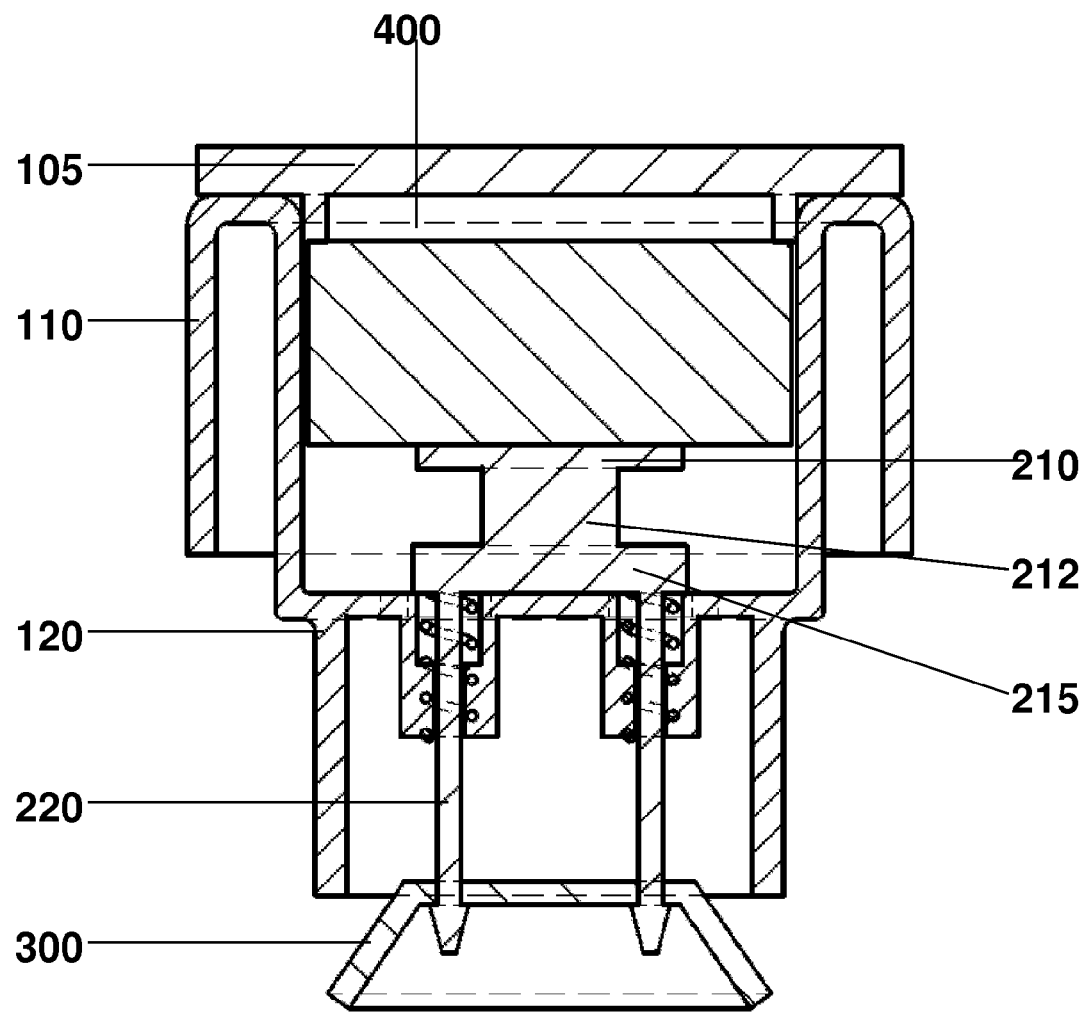
FIG. 6 is the sectional view shown in FIG. 3A with a sealable top on the container and tablet therein, in a resting configuration.

FIG. 6 is the sectional view shown in FIG. 3A with a sealable top on the container and tablet therein, in a resting configuration. The sealable top 105 is adapted to engage a top aperture of the top portion of the chamber 110. As is further shown in FIG. 6, a tablet 400 may be placed in the top region of the chamber 110. The top region of the chamber houses the top portion of the plunger 210, its neck 212, and stem-connecting region 215, and has a generally U-shaped lip for placement over a liquid dispenser or container in a sealable manner. The bottom (thinner) region of the chamber houses the stems 220 and 230 of the plunger. As shown in FIG. 6, the cover/cap 105 allows for liquid to hydrate the top of a tablet 400, but where the device as a whole (as is shown in FIG. 6) is turned upside down or the positive pressure on the liquid entering through a bottom aperture is great, and the space between the cover/cap 105 and the tablet 400 is minimal to prevent too much hydration at the top of the tablet and to ensure the liquid is evenly spread around the tablet. The cover/cap 105 may be flexible, such that it may be pushed inwards near a central region thereof, thereby exerting force on the tablet 400, causing the tablet 400 to move downwards. This downward movement (relative to the orientation of FIG. 6), causes a further downward force on the plunger 210, which then moves downwards and causes the diaphragm 300 to separate from the lower portion of the chamber 120, so as to allow liquid to enter into the bottom aperture of the chamber.

It should be noted that in the embodiment shown in FIG. 6, the plunger is in a partially depressed condition. In a resting condition, the diaphragm, as described above, is flush with the bottom aperture of the chamber. In a resting condition, the top of the tablet 400 may be at the top of the upper portion of the chamber 110 or below the top of the upper portion of the chamber 110. The pressing down of the cap/cover 105 may cause the cap/cover 105 to form a watertight seal with the chamber 110, or such a watertight seal may be achieved by placing the cap/cover 105 in place, depending on the size of the tablet 400 and the exact dimensions and configurations thereof. The watertight seal may be a substantially watertight seal, defined as only allowing a few drops to escape during hydration of the tablet, when in an inverted (relative to what is shown in FIG. 6A) condition.

Figure 7A:
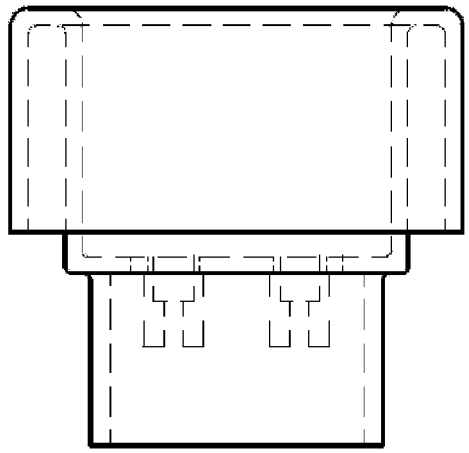
FIG. 7A shows a side translucent view of the chamber itself, in an embodiment of the disclosed technology.
Figure 7B:
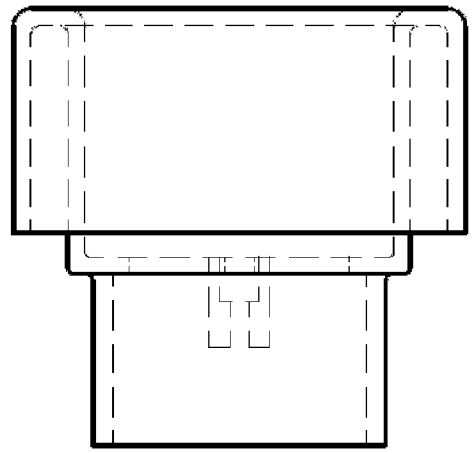
FIG. 7B shows a second side translucent view, rotated 90 degrees with respect to the view shown in FIG. 7A.
Figure 7C:
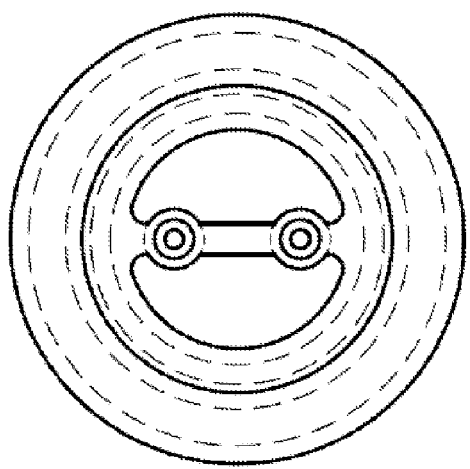
FIG. 7C shows a top view with depth indicators of the chamber itself, in an embodiment of the disclosed technology.

FIG. 7A shows a side translucent view of the chamber itself, in an embodiment of the disclosed technology. FIG. 7B shows a second side translucent view, rotated 90 degrees with respect to the view shown in FIG. 7A. FIG. 7C shows a top view with depth indicators of the chamber itself, in an embodiment of the disclosed technology. These figures show only the chamber, without the additional items such as the plunger and springs. Note that the chamber may have portals adapted for holding the springs and stems in place. The portals and stems are positioned in corresponding positions so as to allow the plunger to fit properly and securely within the chamber. The number of stems corresponds to the number (and placement) of the portals.

Figure 8A:
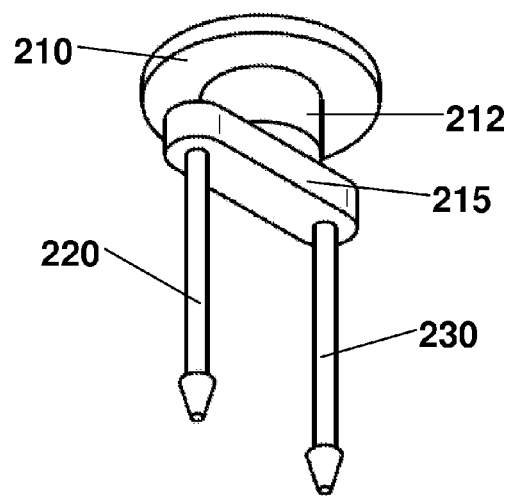
FIG. 8A shows a bottom, perspective view of a plunger with stems in an embodiment of the disclosed technology.
Figure 8B:
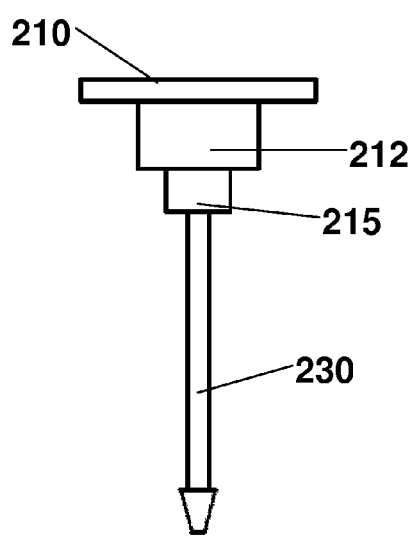
FIG. 8B shows a first side view of the plunger with stems in an embodiment of the disclosed technology.
Figure 8C:
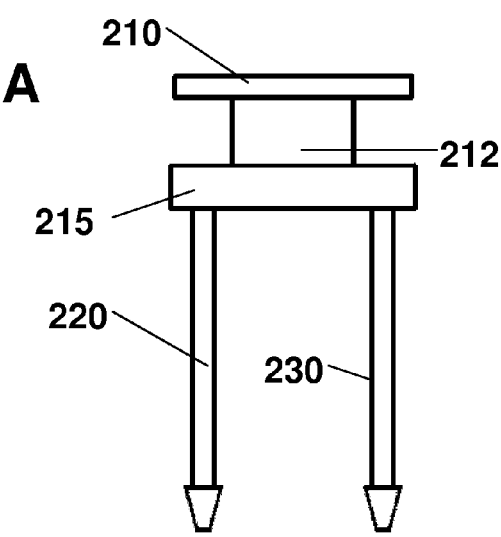
FIG. 8C shows a second side view of the plunger with stems in an embodiment of the disclosed technology.
Figure 8D:
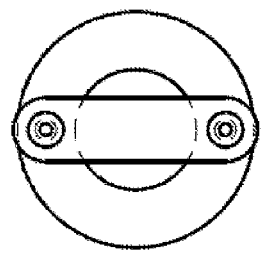
FIG. 8D shows a bottom view of the plunger with stems in an embodiment of the disclosed technology.

FIG. 8A shows a bottom, perspective view of a plunger with stems in an embodiment of the disclosed technology. FIG. 8B shows a first side view of the plunger with stems in an embodiment of the disclosed technology. FIG. 8C shows a second side view of the plunger with stems in an embodiment of the disclosed technology. FIG. 8D shows a bottom view of the plunger with stems in an embodiment of the disclosed technology. The plunger generally is a unitary structure, but may be made of removable parts. The stems 220 and 230 (which may be any number of stems) have terminating cap regions for engagement with a diaphragm, the cap regions being thicker than the rest of the stem, so as to effectively hold a diaphragm 300 in place on the stems when the diaphragm is pulled against a lower portion of a chamber 120 in a resting configuration/state of the devices. The stem connecting region 215 connects the stems to a neck 212, the neck being attached to a plunger top (where the "210" label has been placed).

Figure 9A:
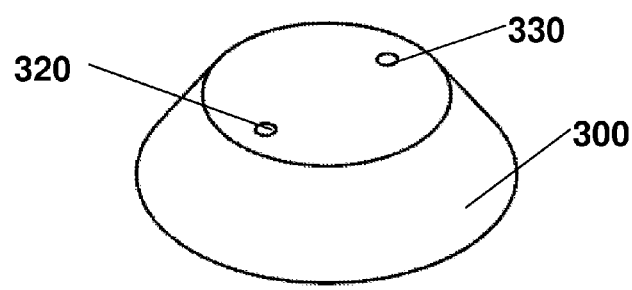
FIG. 9A shows a top perspective view of a diaphragm used in an embodiment of the disclosed technology.
Figure 9B:
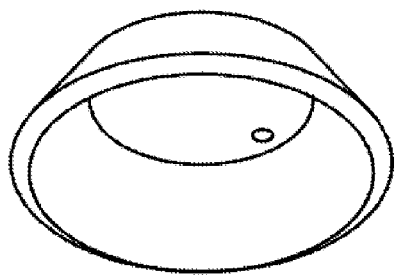
FIG. 9B shows a bottom perspective view of a diaphragm used in an embodiment of the disclosed technology.
Figure 9C:
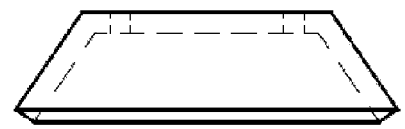
FIG. 9C shows a side translucent view of a diaphragm used in an embodiment of the disclosed technology.
Figure 9D:
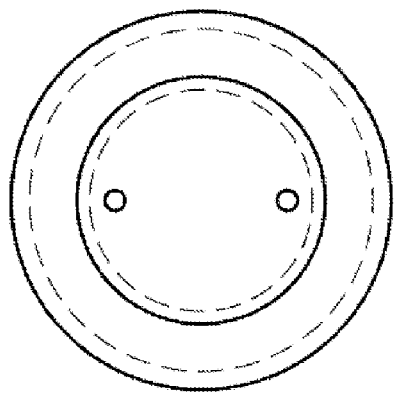
FIG. 9D shows a bottom view of a diaphragm with depth indication used in an embodiment of the disclosed technology.

FIG. 9A shows a top perspective view of a diaphragm used in an embodiment of the disclosed technology. FIG. 9B shows a bottom perspective view of a diaphragm used in an embodiment of the disclosed technology. FIG. 9C shows a side translucent view of a diaphragm used in an embodiment of the disclosed technology. The diaphragm 300 comprises portals 320 and 330 adapted for engagement with stems 220 and 230 and may be in a conic shape terminating at a flat upper region. In this manner, the stems, having wide terminating regions, may be placed through the portals of the diaphragm in a substantially irremovable manner (defined as requiring excessive force to remove or remaining attached to the diaphragm during regular, repeated usage of the device). The diaphragm may be flexible or rigid, but is made of waterproof material, such as a plastic, so as to allow liquid to be retained in a chamber when the diaphragm is pressed against same. As such, in a resting configuration of devices of the disclosed technology, the diaphragm prevents passage of liquid from a container underneath, or a liquid source to or from, the lower portion of the chamber 120.

FIG. 10A shows an exploded view of a chamber with diaphragm, tablet, and sealable top cover in an embodiment of the disclosed technology. FIG. 10B shows a top side perspective view of a sealed chamber with tablet therein in an embodiment of the disclosed technology. FIG. 10C is a translucent version of FIG. 10B. The top cap/cover 105 may be fixedly attached to, or formed as an integral part of, a further device, such as a string or plastic connector, which, in turn, is connected to the chamber or a container comprising a liquid (e.g., a liquid source such as a container) so as to prevent loss of the cover. The cover is generally cylindrical and fits within the top of the chamber 110 so as to form a seal or substantial seal. A tablet 400 is placed therein underneath the top 105 and into the top portion of the chamber 110. Thus, by way of pushing down on (providing positive force) against the cover 105, the cover will either bend or be pushed down entirely, such that a force is exerted on the tablet 400, which in turn, exerts a force on the plunger 210 and the diaphragm is moved/separated from the lower portion of the chamber 120, and liquid may enter the chamber and douse the tablet 400.

The above may be accomplished by placing a bottom of the tablet 400 on a plunger, such as plunger 210. The plunger, as noted above, is situated in a chamber, such as the upper portion of the chamber 110. The plunger further comprises stems, such as stems 220 and 230 extending out a first side of the chamber. The tablet 400, when placed in the chamber 110 is surrounded by the chamber (that is, the side and bottom, in total, are within the interior space of the chamber). Holding the tablet 400 in position on the plunger, a user may invert the tablet, plunger, and chamber in one motion (that is, together). Once inverted, such that the narrow bottom portion of the chamber 120 is above the wider top portion of the chamber 110, a user may depress the tablet and the plunger, allowing liquid to enter the chamber and submerge the tablet in the liquid. The liquid, by way of gravitational forces, will flow through an aperture of the chamber nearest the diaphragm, past the plunger, and around the tablet, until reaching at least all of the sides of the tablet and, in some embodiments, the top of the tablet.

A cap, such as cap 105, may be placed on the tablet after the tablet 400 is placed in the chamber 110 and before the inversion. In this manner, when inverted, the cap is depressed causing the depression of the tablet 400, plunger 210, and diaphragm 300; and the liquid, after entering the chamber 110, is held in place (watertight seal of cap) or substantially held in place (such that no more than a few drops escape, e.g., substantially watertight) around the tablet, including over the top side of the tablet, just beneath the cap 105. To ensure that the tablet 400 has been properly doused or hydrated, the chamber may be substantially filled, that is, comprising liquid in the open spaces (airspace) of the chamber from the cap 105 to at least part of the lower portion of the chamber 120, where some air bubbles may remain.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed technology.

I claim:

1. A device comprising:
    a chamber, a cover, a tablet, and a plunger, said chamber comprising a sealable top opening that accommodates the cover and seals the chamber;
    said plunger comprising a plurality of spring-loaded stems connected to said plunger;
    said spring-loaded stems each passing through an aperture in said chamber, said apertures further adapted for passage of liquid there-through;
    said stems further extending through a diaphragm that is the seal member of the plunger; and
    said tablet located beneath said cover and over said stems that are connected to said plunger.

2. The chamber and plunger of claim 1, further comprising a tablet, said tablet comprising a circumference less than a circumference of said chamber.

3. The chamber and plunger of claim 2, wherein in a resting position, said tablet fits within said chamber.

4. The chamber and plunger of claim 3, wherein a ratio of a height of said tablet and a height of said chamber is 5 to 9.

5. The chamber and plunger of claim 3, wherein in a depressed position of said plunger, all sides of said tablet are hydrated.

6. A kit comprising:
    a chamber, a cover, a tablet, and a plunger,
    said chamber comprising a sealable top opening that accommodates the cover and seals the chamber;
    said plunger comprising a plurality of spring-loaded stems connected to said plunger;

said spring-loaded stems each passing through an aperture in said chamber, said apertures further adapted for passage of liquid there-through;

said stems further extending through a diaphragm that is the sealing member of the plunger; and said tablet located beneath said cover and over said stems that are connected to said plunger.

7. The kit of claim 6, wherein said tablet is cylindrical.

8. The kit of claim 6, wherein said tablet is a towelette.

9. The kit of claim 6, wherein said vertical rise and said height of said tablet is ¼ inch.

10. The kit of claim 9, wherein said height of an interior of said chamber is between ⅜ and ½ inch.

11. A device comprising:

a chamber having a top and bottom comprising a spring-loaded plunger extending through said bottom, said plunger forming a unitary structure with stems within the chamber and extending through bottom apertures of said chamber to an exterior of said chamber, said chamber being adapted for loose-fitting placement of a tablet therein, said tablet comprising a bottom side and a top side, said spring-loaded plunger comprising a first resting position and a second depressed position, wherein in said first resting position, said side of said cylindrical tablet in contact with the stems and surrounded by said chamber, and in a second depressed position of said spring-loaded plunger, said top side of said cylindrical tablet is in contact with the stems below said top of said cylindrical chamber and said bottom aperture allows entry of liquid into said chamber;

wherein said tablet is surrounded by liquid, in said second depressed position.

12. The device of claim 11, wherein said chamber and said tablet are cylindrical.

13. The device of claim 12, wherein a cover of said cylindrical chamber is adapted for substantially watertight engagement with said chamber.

14. The device of claim 13, wherein a change from said first resting position to said second depressed position is by way of pressing said tablet in said chamber against said plunger in said chamber.

15. A method for submerging a tablet in water, comprising:

a plunger situated in a chamber and comprising a first side of the stems extending out of a first side of said chamber, wherein a side of said tablet is surrounded by said chamber;

placing a bottom of said tablet on the first side of the stems, placing a cap over said tablet and said first side of the stems of the plunger, holding said tablet in position on said plunger and inverting said tablet, plunger, and chamber in one motion;

depressing said tablet and said plunger, allowing liquid to enter said chamber and submerge said tablet in said liquid.

16. The method of claim 15, wherein said depressing is by way of depressing said cap into said tablet and said plunger.

17. The method of claim 16, wherein said cap forms a substantially watertight seal with said chamber, at least during said step of depressing.

18. The method of claim 17, further comprising a step of substantially filling said chamber with said liquid.

19. A device comprising said tablet, said liquid, said cap, and said plunger, adapted for carrying out the method of claim 18.

* * * * *